Feb. 28, 1967 L. D. DIEDRICHSEN 3,306,985

SMALL AUTOMATIC SWITCHBOARD FOR FOUR-WIRE TELEPHONE SYSTEM

Filed Dec. 23, 1963 7 Sheets-Sheet 1

INVENTOR,
LOREN D. DIEDRICHSEN.

BY: Harry M. Saragovitz, Edward J. Kelly, Herbert Berl & Julian C. Keppler ATTORNEYS Feb. 28, 1967 L. D. DIEDRICHSEN 3,306,985

SMALL AUTOMATIC SWITCHBOARD FOR FOUR-WIRE TELEPHONE SYSTEM

Filed Dec. 23, 1963 7 Sheets-Sheet 2

INVENTOR,
LOREN D. DIEDRICHSEN.

BY: Harry M. Saragovitz,
Edward J. Kelly,
Herbert Berl &
Julian C. Keppler

ATTORNEYS.

Feb. 28, 1967 L. D. DIEDRICHSEN 3,306,985

SMALL AUTOMATIC SWITCHBOARD FOR FOUR-WIRE TELEPHONE SYSTEM

Filed Dec. 23, 1963 7 Sheets-Sheet 3

INVENTOR.
LOREN D. DIEDRICHSEN.

BY: Harry M. Saragovitz,
Edward J. Kelly,
Herbert Berl &
Julian C. Keppler
ATTORNEYS INVENTOR,
LOREN D. DIEDRICHSEN.
BY: Harry M. Saragovitz, Edward J. Kelly, Herbert Berl & Julian C. Keppler
ATTORNEYS INVENTOR,
LOREN D. DIEDRICHSEN.
BY Harry M. Saragovitz,
Edward J. Kelly,
Herbert Berl &
Julian C. Keppler
ATTORNEYS.

Feb. 28, 1967 L. D. DIEDRICHSEN 3,306,985

SMALL AUTOMATIC SWITCHBOARD FOR FOUR-WIRE TELEPHONE SYSTEM

Filed Dec. 23, 1963

7 Sheets-Sheet 6

INVENTOR,
LOREN D. DIEDRICHSEN

BY: Harry M. Saragovitz,
Edward J. Kelly,
Herbert Berl &
Julian C. Keppler
ATTORNEYS.

INVENTOR,
LOREN D. DIEDRICHSEN.
BY: Harry M. Saragovitz,
Edward J. Kelly,
Herbert Berl &
Julian C. Keppler ATTORNEYS United States Patent Office 3,306,985

Patented Feb. 28, 1967

3,306,985

SMALL AUTOMATIC SWITCHBOARD FOR FOUR-WIRE TELEPHONE SYSTEM

Loren D. Diedrichsen, Long Branch, N.J., assignor to the United States of America as represented by the Secretary of the Army Filed Dec. 23, 1963, Ser. No. 332,982
14 Claims. (Cl. 179—91)

The invention described herein may be manufactured and used by or for the Government for governmental purposes without the payment of any royalty thereon.

The present invention relates to a novel and useful telephone switchboard and more particularly to a small transistorized automatic switchboard specifically designed for military use in forward battle areas. Such a switchboard must be light in weight and compact for portability, consume a minimum amount of power, and provide the utmost reliability under rigorous field use. The present switchboard includes all of these desirable features and also provides the automatic switching and supervisory functions of more complex fixed installations. The present switchboard was designed to accommodate the four-wire electronic telephones recently developed for use in the field by the U.S. Army. A time slot determined by a unique pair of pulses from a time slot generator is used to identify each line connected to the switchboard. No links are used in connecting calling and called parties. Connections are established via a triangular non-blocking matrix which permits all of the connected telephones to be used simultaneously with a minimum of circuitry. Novel bistable logic circuitry is included for reliability and low power drain. The reliability of the switchboard is enhanced by providing duplicate circuitry for the most vital components thereof. Automatic error detection circuitry constantly monitors the outputs of these components and automatically switches over to the duplicate circuitry in case of failure thereof.

It is therefore an object of this invention to provide a compact automatic switchboard adapted for military field use.

It is a further object of this invention to provide a small, easily portable, lightweight automatic switchboard adapted for use with four-wire electronic telephones.

Another object of the invention is to provide a transistorized automatic switchboard which draws a minimum of power while providing maximum reliability.

A further object of this invention is to provide a small automatic switchboard with novel logical circuitry adapted to minimize the power drain of said switchboard.

A still further object of this invention is to provide a novel bistable transistorized logic circuit.

Figure 1:
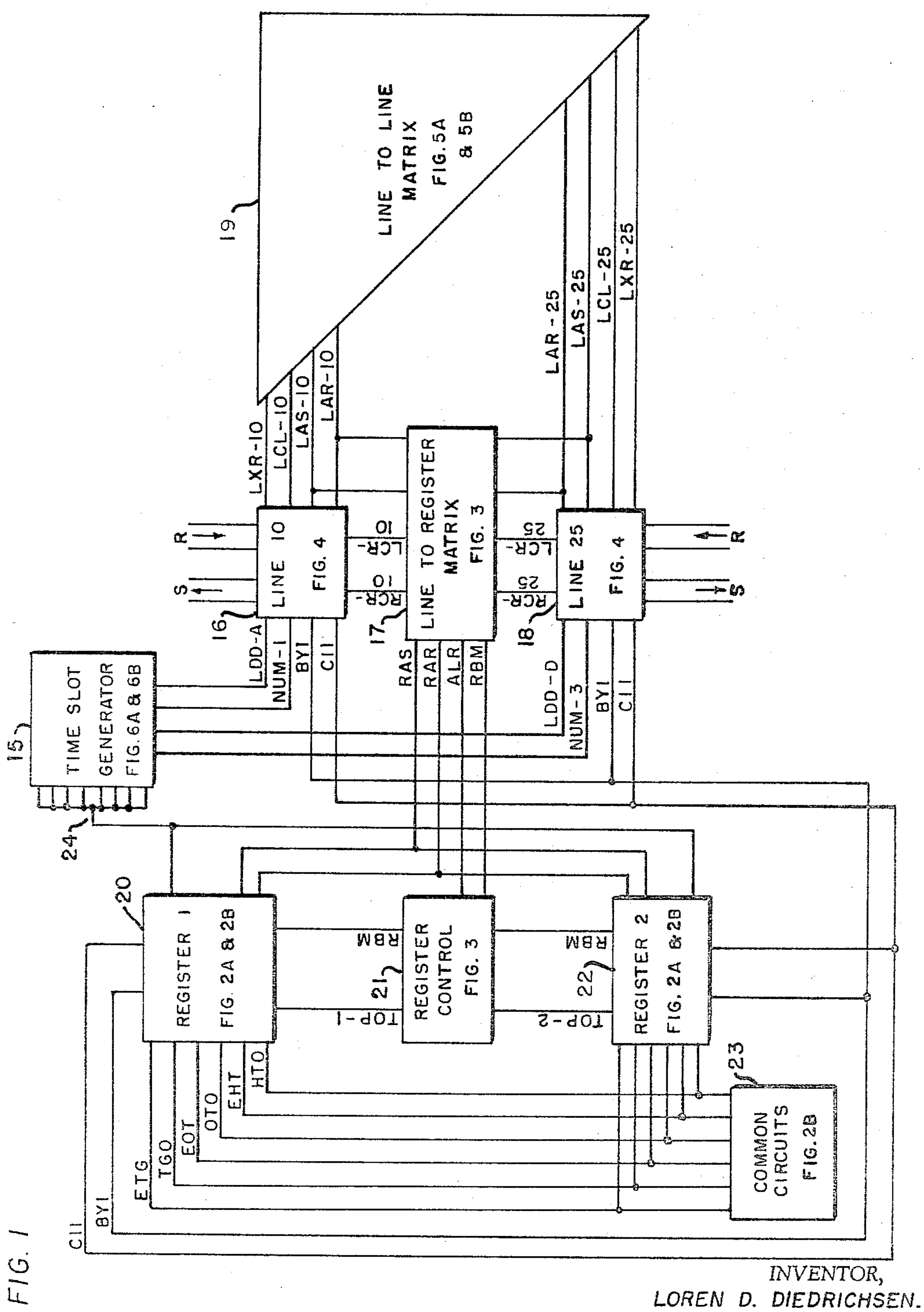
Figure 2A:
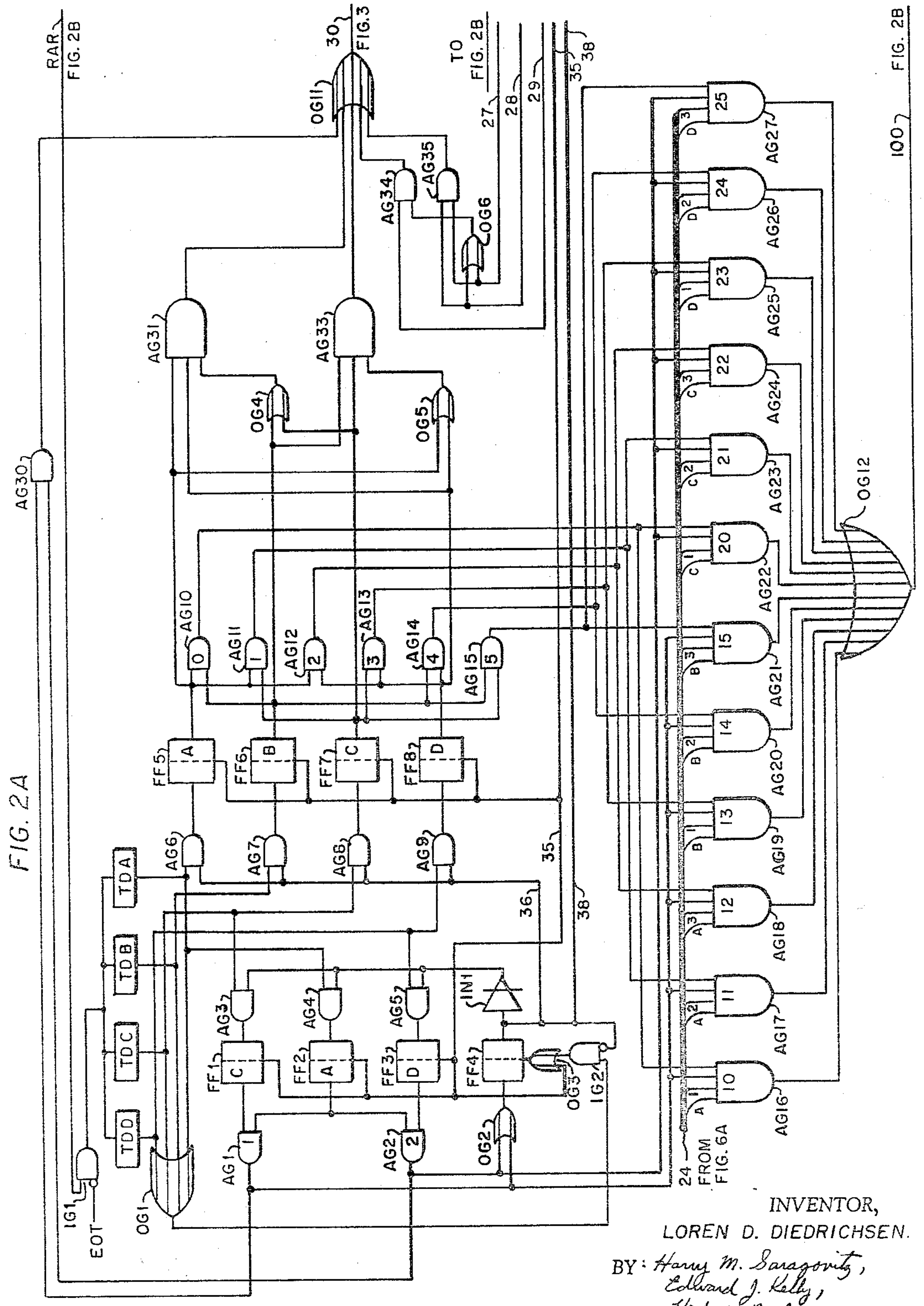
Figure 2B:
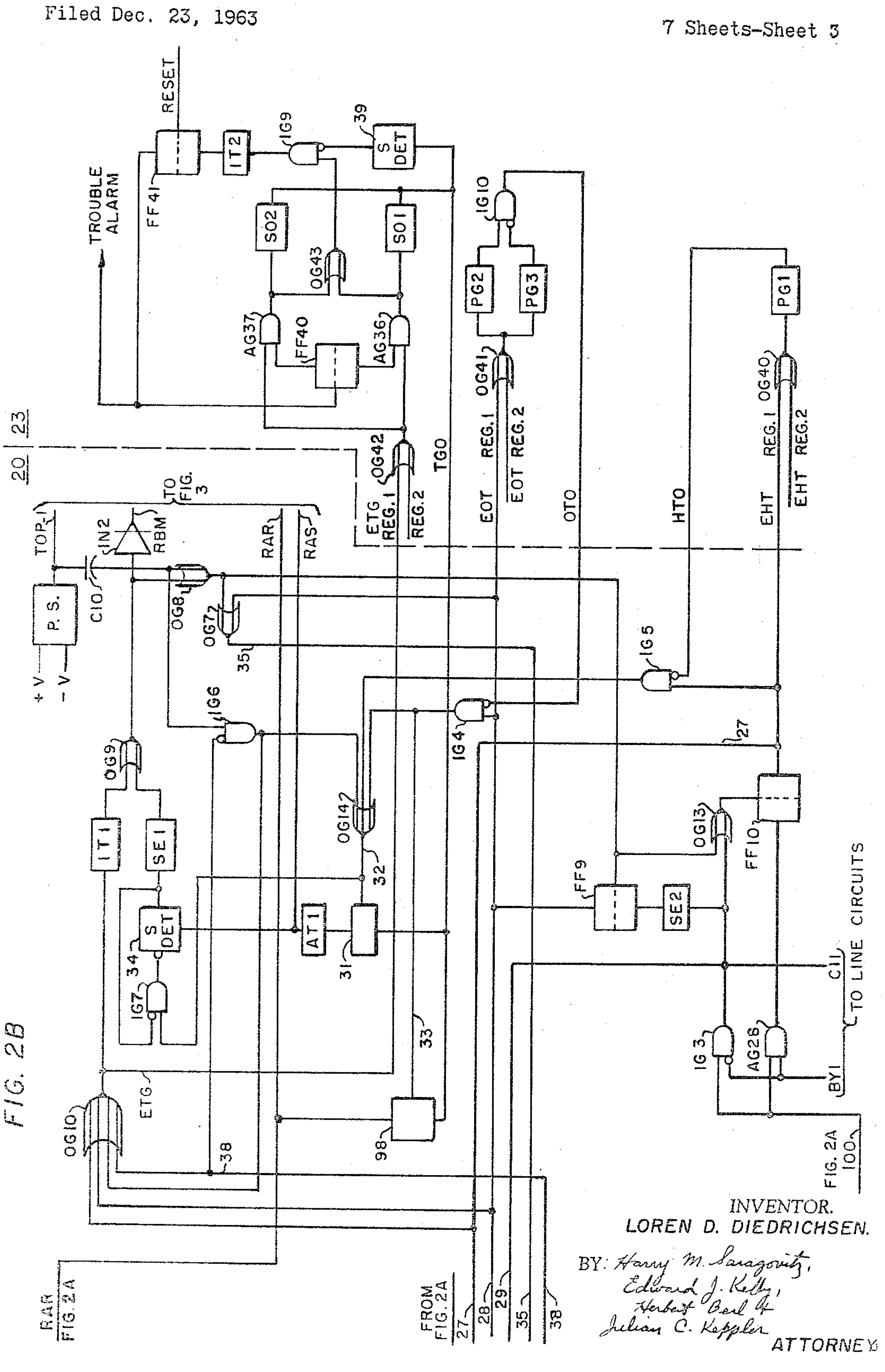
Figures 3, 4, 7:
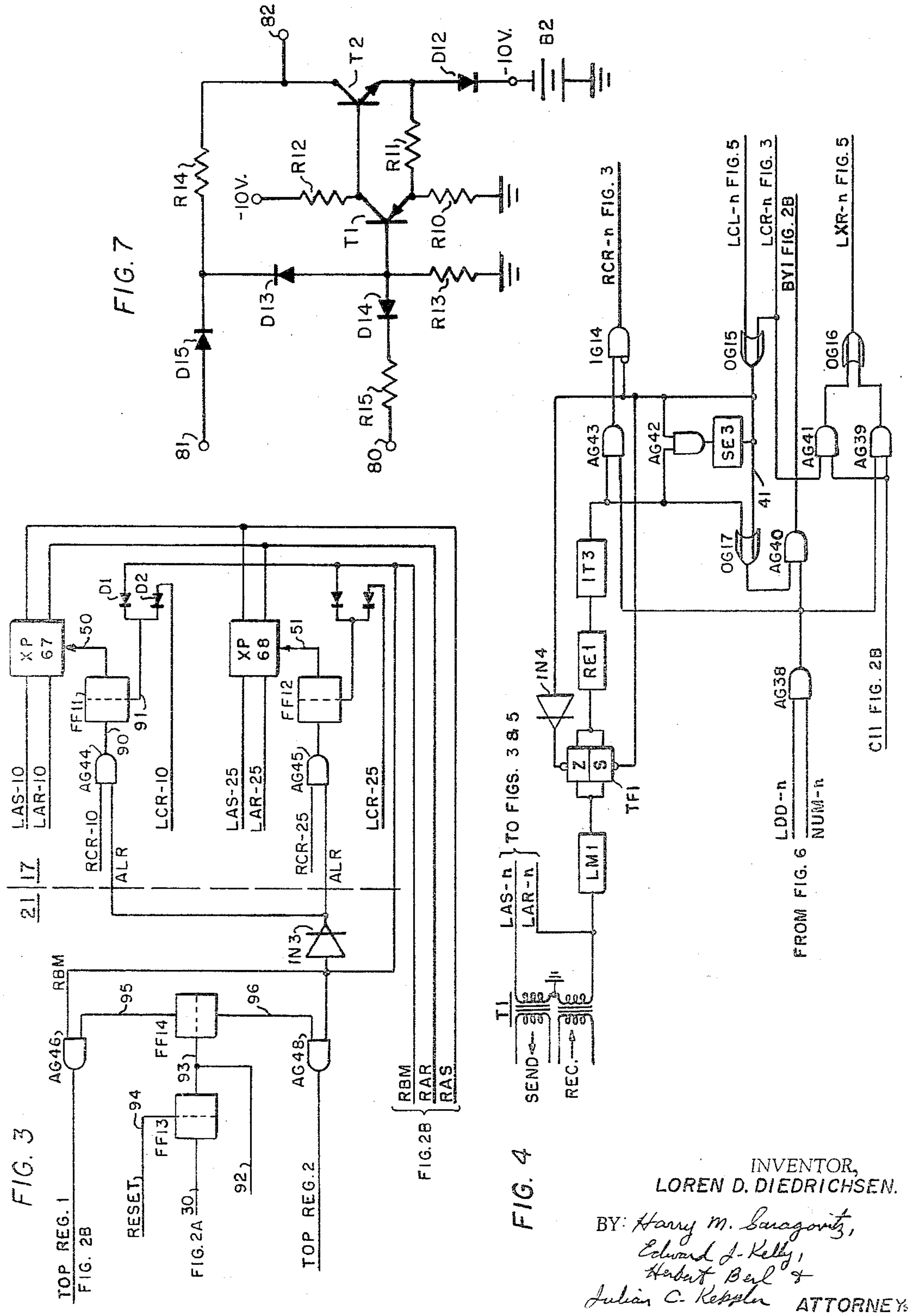

Other objects and advantages of the invention will become apparent from the following detailed description and drawings, in which FIG. 1 is a block diagram of the novel automatic switchboard of the present invention, and FIGS. 2 to 6 are detailed diagrams of the components illustrated in block form in FIG. 1, and FIG. 7 is a novel bistable logic circuit which is used in various parts of the switchboard.

Referring now to FIG. 1, there is shown thereon in block form a preferred embodiment of a novel switchboard constructed according to the principles of the present invention. The described switchboard is designed to accommodate twelve four-wire electronic telephones. A line circuit is provided for each of the twelve telephones, however, only the line circuits of lines 10 and 25 are illustrated, the others being similar and connected to the rest of the circuit in the same manner as those shown. The directory numbers of the twelve telephones and corresponding line circuits are 10 through 15 and 20 through 25. This method of numbering simplifies the decoding circuitry of the register, for reasons which will become apparent. Two pairs of wires connect each telephone to its particular line circuit. The pair marked S is used to transmit or send voice or supervisory signals to each telephone and the pair marked R is used to receive these signals from each telephone. Each of the electronic telephones contains a seize tone oscillator which sends a 500 cycle tone to its line circuit when a party goes "off-hook" or lifts the receiver and also a 1700 cycle oscillator for producing a release tone when the party hangs up or goes "on-hook." Each telephone also includes four additional oscillators used for generating dialing tones. Different pairs of these four dialing frequencies represent different ones of the numbers 0 through 5. The line circuits are identified by 10 millisecond periods of time generated by the presence of a particular combination of letter and numeral signals from the time slot generator 15. For example, the leads LDD–A and NUM–1 are connected to line circuit 10 from time slot generator 15. During a 10 millisecond interval outputs will appear on both of these leads to define the time slot A1 for line 10. Similarly, leads LDD–D and NUM–3 are connected to line circuit 25 to define the time slot D3 for line 25. Four letter and four numeral signals are produced by the time slot generator and the time slots are assigned to the lines as follows:

| Line: | Time slot |
|---|---|
| 10 | A1 |
| 11 | A2 |
| 12 | A3 |
| 13 | B1 |
| 14 | B2 |
| 15 | B3 |
| 20 | C1 |
| 21 | C2 |
| 22 | C3 |
| 23 | D1 |
| 24 | D2 |
| 25 | D3 |

All of the outputs of the time slot generator, LDD–A through LDD–D and, NUM–1 through NUM–4 are also applied to the registers 1 and 2 via cable 24.

Each of the line circuits contains means to detect seize or release tones sent from its connected telephone. On receipt of a seize tone the line circuit produces a "register connect request" pulse on lead RCR. This pulse is applied to the line-to-register matrix 17 which controls access to the registers. Register 1 is normally used and register 2 is a duplicate which is automatically switched into the circuit upon failure of register 1. If primary register 1 is idle a "register allot pulse" will appear on lead ALR and effect the connection of the calling line circuit to both registers via the line's crosspoint in matrix 17. Simultaneously, a pulse appears on lead RBM to indicate that the register is busy. If the register is busy the line circuit will continue to pulse the line-to-register matrix during the line's time slot until either the register becomes idle or the calling party abandons the call. When the matrix 17 connects a line to the registers, a "line connected to register" pulse is sent back to the calling line circuit on lead LCR. Simultaneously, a "register busy mark," RBM, is sent to register control 21 from matrix 17. The RBM pulse removes the allot register signal, ALR, and prevents the seizure of the register by any other line circuits. The RBM pulse is also used to turn on the power to the primary register 1 by supplying a pulse on lead TOP1. In the register, detection, storage, and decoding of the address or dialing information occurs, as well as the generation of certain call progress and call alerting signals. Upon receipt of the TOP1 pulse, the register 1 provides power to all of its circuitry, resets all flip-flips and flip-flips therein and returns dial tone, a steady 500 cycle tone, to the calling line via the RAS lead, the line-to-register matrix 17 and the LAS lead which is connected to the calling party via the sending pair S. The dial tone is generated by an oscillator in the common circuits 23 and is applied to the register via lead TGO. Storage of the first address or dialing digit in the register turns off the dial tone. After storage of the second dialing digit the register produces a pulse on lead CII during the time slot of the called party which is applied to each of the line circuits. If the called party is busy the CII pulse is inhibited and a busy signal is sent back to the called party. If the called party is idle, the coincidence of the pulse on lead CII and the pulse from the time slot generator during the called line's time slot produces a pulse on lead LXR which is applied to the line-to-line matrix 19. Simultaneously, the coincidence of the pulse on lead CII and the pulse on lead LCR of the calling line circuit produces a pulse on lead LXR of the calling line circuit. The coincidence of the two LXR pulses in matrix 19 causes the crosspoint therein associated with the calling and called lines to close, thereby connecting the S pair of the called line to the R pair of the calling line and the S pair of the calling line to the R pair of the called line. The closure of the line-to-line crosspoint sends a "line connected to line" pulse to both the calling and called line circuits on the leads LCL. This pulse produces a pulse on lead BYI during the respective time slots of both lines to mark these lines busy. The register then sends a ringback tone through line-to-register matrix 17 to the calling line and ring signal through both of the matrices to the called line. These signals are sent until either the called party answers, the register times out, or the calling party abandons the call. When the called party answers, the register is disconnected and made available to handle the next call. The line-to-line crosspoint is disconnected when either party generates a release tone by hanging up.

FIG. 4 illustrates one of the twelve similar line circuits. The send and receive pairs S and R from the remote telephone, not shown, are applied to audio transformer T1. The ungrounded ends of the secondary of T1 form the leads LAS*n* and LAR*n* which are applied to the line-to-line matrix and the line-to-register matrix, as indicated in FIG. 1. The lead LAR*n* is also connected to the input of limiter LM1, the output of which is applied to twin filter TF1. The purpose of TF1 is to selectively pass either seize or release tone received from the connected telephone over the R pair. The S or seize tone section of TF1 will pass the seize tone if not inhibited by a signal at the inhibit input thereof which is connected to the output of OR gate OG15. The Z or release tone section of TF1 will pass the release tone if not inhibited by an output from inverter IN4, the input of which is also connected to the output of OG15. The inputs of OG15 are a "line-connected-to-line signal," LCL, from the line-to-line matrix 19 and a "line-connected-to-register" signal, LCR, from the line-to-register matrix 17. Thus if a particular line is either connected to the register via matrix 17 or to another line via matrix 19, OG15 will have an output and the seize tone filter of TF1 will be inhibited but the release tone filter thereof will not be inhibited. If the line circuit is connected neither to the register nor another line, OG15 will have no output and the release tone section (Z) of TF1 will be inhibited and the S section thereof will pass any seize tone from the connected telephone. The outputs of both the S and Z detectors are converted to direct current by rectifier RE1, the output of which is applied to interval timer IT3. IT3 produces an output if its input persists for a predetermined time interval. This insures that voice currents which momentarily equal the seize or release frequencies will not produce outputs from IT3. The output of IT3 forms one of the inputs of AND gates AG42 and 43. The other input of AG43 is the output of AG38, the inputs of which are LDD*n* and NUM*n*. Inhibit gate IG14 has one input connected to the output of AG43 and its inhibit input connected to the output of OG15. The output of IG14 is the lead RCR*n* which applies a "register connect request" pulse to the crosspoint corresponding to the line in the line-to-register matrix. During the time slot assigned to any particular line, pulses will appear on both LDD*n* and NUM*n* and produce an output from AG43 if IT3 also has an output. The output of AG43 therefore sends a "register connect request" pulse to the line-to-register matrix via inhibit gate IG14 and lead RCR*n* during the time slot of the line if seize tone is being sent from the connected telephone. OR gate OG17 has one input connected to the output of IT3 and the other input connected to the output of OG15. The output of OG17 forms one of the inputs of AND gate AG40, the other input of which is the output of AG38. Thus AG40 will have an output during the line's time slot if seize or release tone is being detected by TF1, RE1 and IT3 or the line is connected either to the register or to another line. The output of AG40 is fed back to both registers via lead BYI to form a busy signal. AND gate AG41 has one input connected to lead CII and the other input to lead LCR*n* and its output forms one of the inputs of OR gate OG16. AND gate AG39 has one input connected to the output of AG38, the other input to lead CII and its output forms the other input of OG16. In the called line circuit AG39 produces an output during the time slot of the called line which passes through OG16 to produce a "line crosspoint request" on lead LXR*n* which is applied to the line-to-line matrix 19. In the calling line circuit the coincidence of the "line connected to register" signal on lead LCR*n* will produce an output from AG41 during the called line's time slot and therefore produce a simultaneous output on LXR*n* of the calling line. AND gate AG42 has one input connected to the output of IT3 and the other input to the output of OG15. Therefore AG42 will have an output if release tone is detected by TF1, RE1 and IT3 and the particular line is connected either to the register or to another line. The output of AG42 is applied to signal end detector SE3 which detects the end of the pulse output of AG42 and produces a ground in response thereto which is applied to lead 41. This ground signal passes through OG15, lead LCL and thence to the line-to-line matrix to break the crosspoint connection. It is necessary to detect the end of the release tone to enable it to pass through the switchboard to other connected switchboards so that all connections in the system will be released. IG14 prevents the sending of "register connect request" pulses if the line is already connected to the register or to another line.

The line-to-register matrix 17 is shown to the right of the dashed line in FIG. 3 and the register control circuit 21 to the left thereof. The line-to-register matrix comprises a crosspoint switch array arranged in a single twelve-by-one column. Two of these crosspoints XP67 and XP68 are illustrated, and these correspond respectively to the line circuits 10 and 25 of FIG. 1. Each of the crosspoint switches comprise a double pole, single throw switch, which is closed by the output of a flip-flip circuit to connect the send and receive leads, LAS and LAR, of a particular line circuit to the leads RAS and RAR respectively, which are connected to both registers. The upper crosspoint switch XP67 is associated with line circuit 10 and the leads LAS–10 and LAR–10, from line circuit 10 form the inputs of XP67. AND gate AG44 has as one input the lead RCR–10 from line circuit 10 and as the other input the register allot pulse, on lead ALR from the output of inverter IN3. The output of AG44 is connected to the set input 90 of the flip-flip FF11, the set output of which is applied to XP67 via lead 50 to close this crosspoint. The flip-flip FF11 is a bistable logic circuit which is illustrated in detail in FIG. 7. In the set condition both transistors comprising the flip-flip are on or conducting and in the rest condition both transistors are off. Further, a negative voltage appears on the reset lead 91 of this flip-flip when in the set condition. The flip-flip is reset by grounding the reset input thereof. Therefore with FF11 in the reset condition, no voltage will appear on lead RBM and hence IN3 will produce an output to lead ALR. If a "register connect request" appears on lead RCR–10 from line circuit 10, FF11 will be set, closing crosspoint XP67 and connecting leads LAS–10 and LAR–10 to RAS and RAR respectively. Simultaneously, the negative voltage appearing at the reset input 91 of FF11 will be applied to lead RBM through diode D1 and to LCR–10 through diode D2. The voltage on RBM will remove the output from inverter IN3 and prevent any other lines from seizing the register. The register control circuit comprises flip-flop FF14, the set and reset outputs of which form one of the inputs of AND gates AG46 and AG48, the other input of each of these gates being lead RBM. Flip-flop FF14 is normally set, that is, the upper half is normally conducting and an output appears on lead 95 and no output on lead 96. As soon as any line closes a line-to-register crosspoint, the voltage on RBM produces a pulse at the output of AG46 which applies operating power to primary register 1 via lead TOP1. The register includes error-checking circuitry which will be described below. In the event of failure of register 1, the error-checking circuitry thereof will produce a pluse on lead 30 which will set flip-flip FF13, the output of which will reset FF14 via lead 93. The signal on lead 92 is applied to a trouble alarm circuit, not shown. The resetting of FF14 will remove the signal from lead TOP1 and apply it to TOP2, thus removing the power from the primary register and applying it to duplicate register 2.

The circuitry of the primary register 1 is shown in FIGS. 2A and 2B, which should be arranged side by side with FIG. 2A on the left. Duplicate register 2 is the same as register 1 except that no error checking circuitry is included therein. The common circuits 23 are also shown in FIG. 2B to the right of the dashed line. When a pulse from the register control circuit 21 of FIG. 3 is received on lead TOP1 it is applied to power supply PS to apply +V and —V bias voltage to all register circuitry. Lead TOP1 is also applied to one input of OR gate OG8 via capacitor C10 and inhibit gate IG6; the output of OG8 is applied to one input of OG7 and also to the reset input of flip-flip FF9 and to the reset input of flip-flip FF10 through OR gate OG13. The output of OR gate OG7 is applied to the reset inputs of flip-flips FF1 through FF8 via lead 35. Thus the pulse on lead TOP1 resets all of the flip-flops of the register after power is applied. The output of IG6 forms one input of OR gate OG14, the output of which forms the control input of audio gate 31 and also one of the inputs of inhibit gate IG7. The output of IG6 also forms one of the inputs of OR gate OG10, the output of which is applied to interval timer IT1 and also to lead ETG. Thus the TOP1 pulse passes through IG6, OG10 and thence produces an "enable tone generator pulse" on lead ETG which is applied to the common circuits 23 to enable or turn on the 500 cycle tone generator therein. The tone generator output is fed back to the register via lead TGO and forms the signal input of the two audio gate 31 and 98. The output of 31 is applied to attenuator AT1, the output of which is applied to seize tone detector 34 and lead RAS. The output of audio gate 98 is applied to lead RAR. The purpose of audio gate 31 is to send dial tone, ringback tone and busy signals to the calling party over lead RAS and the line-to-register matrix and the purpose of audio gate 98 is to send ring signals to the called party through lead RAR, the line-to-register matrix and the line-to-line matrix. Seize tone detector 34 has its output connected to the input of signal end detector SE1, the output of which forms one of the inputs of OR gate 9. The other input of OG9 is the output of interval timer IT1. The output of OG9 forms the input of inverter IN2 and the second input of OG8. The output of IN2 is fed to the line-to-line matrix via lead RBM. The output of seize tone detector 34 also forms the inhibit input of inhibit gate IG7.

Dialing frequencies or tones are applied from the calling telephone over the R pair thereof through the line-to-register matrix and thence to the register over lead RAR which is connected to the input of inhibit gate IG1 of FIG. 2A. These dialing tones are detected in tone detectors TDA through TDD. The digits from 0 through 5 are represented by different pairs of the four dialing tones A through D, according to the following table:

$0=AB$
$1=AC$
$2=AD$
$3=CD$
$4=BD$
$5=BC$

The output of IG1 is applied to all of the tone detectors TDA through TDD. The first digit of a called directory number is decoded by the flip-flips FF1, FF2 and FF3 and the associated AND gates AG1 through AG5. The set output of FF1 is connected to one input of AG1, the other input of which is the set output of FF2. The inputs of AG2 are the set output of FF2 and the set output of FF3. The flip-flips FF1 through FF3 are set by outputs from AND gates AG3 through AG5 respectively. The second digit of a called directory number is decoded by flip-flips FF5 through FF8 and the associated AND gates AG6 through AG9. Flip-flips FF5 through FF8 are set by the outputs of AG6 through AG9 respectively. The set output of FF5 forms one of the inputs of AG10, AG11 and AG12. The set output of FF6 forms one of the inputs of AG10, AG14 and AG15. The set output of FF7 forms one of the inputs of AG11, AG13 and AG15. The set output of FF8 forms one of the inputs of AG12, AG13 and AG14. The output of TDA forms one input of AG6, AG4 and OR gate OG1. The output of TDB forms one input of AG7 and OG1. The output of TDC forms one input of AG8, AG3 and OG1. The output of TDD forms one input of AG5, AG9 and OG1. The output of OG1 is applied to one input of inhibit gate IG2, the output of which is connected to one input of OR gate OG3. The other input of OG3 is the reset lead 35. The output of OG3 resets steering flip-flip FF4, the set input of which is connected to the output of OR gate OG2. The set output of FF4 is connected to the input of inverter IN1 and to the inhibit input of IG2. The output of IN1 forms one of the inputs of each of AND gates AG3, AG4 and AG5. The set output of FF4 is also applied to one input of each of AND gates AG6 through AG9 via lead 36 and also to one input of OG10 and the inhibit input of IG6 via lead 38. The set output of FF4 is also applied to the inhibit input of IG2. Prior to the receipt of the first pair of dialing tones, all of the flip-flips FF1 through FF8 will be reset by the reset signal or pulse from lead 35. Inverter IN1 will therefore have an output since FF4 will have no voltage on the set output thereof, therefore the AND gates AG3, AG4 and AG5 will pass the outputs of the tone detectors to the flip-flips FF1, FF2 and FF3. If the first digit of the dialed directory number is 1 (AC), TDA and TDC will have outputs and FF1 and FF2 will be set, resulting in an output from AG1. If the first digit is 2 (AD), TDA and TDD will have outputs and FF2 and FF3 will be set, thereby producing an output from AG2. These are the only two possibilities for the first digit due to directory numbering system used. The output of OG1 applies the outputs of all of the tone detectors to the reset input of FF4 via IG2 and OG3 to insure that FF4 remains reset during detection of the first digit. At the end of the dialing tones of the first digit, OG1 will no longer have an output and the output of either AG1 or AG2 will set FF4 via OR gate OG2. During the detection of the second digit the set output of FF4 inhibits IG2 and prevents the output of OG1 from resetting FF4. The setting of FF4 inhibits IG2, removes the output from IN1 and enables gates AG6 through AG9 to pass the outputs of the tone detectors to flip-flips FF5 through FF8 for the decoding of the second directory digit, which may be 0 through 5. The setting of FF4 also inhibits IG6 and thereby closes audio gate 31 to stop the sending of dial tone to the calling party. One of the AND gates AG10 through AG15 will have an output depending on which pair of the tone detectors is energized by the sending of the second digit from the calling telephone. The numbers within gates AG10 through AG15 indicate the directory numbers represented thereby. The AND gates AG16 through AG27 and OR gate OG12 are connected to the decoding circuitry in such a way as to produce an output from OG12 during the time slot of the called party. One of the gates AG16 through AG27 is provided for each of the connected telephones as indicated by the directory numbers 10–15 and 20–25 within these gates. Since the first digit of the directory number of lines 10–15 is 1, each of the gates AG16 through AG21 has, as one input, the output of AG1. Similarly gates AG22 through AG27 have as one input, the output of AG2. The output of AG10, representing 0, forms one of the inputs of AG16 and AG22, the output of AG11, representing 1, forms one of the inputs of AG17 and AG23, etc. The other two inputs of each of the gates AG16 through AG27 comprise a pair of the outputs of the time slot generator 15, fed to the register over cable 24. For example, outputs LDDA and NUM1, defining the time slot A1 assigned to line 10, are connected to AG16, LDDA and NUM2, defining the time slot A2 assigned to line 11 are connected to AG17, etc. All of the gates AG16 through AG27 have their outputs connected to different inputs of OR gate OG12. Thus after the second directory number is sent from the calling telephone, one of the gates AG16 through AG27 corresponding to the called telephone will produce an output during the time slot of the called line. This pulse will pass through OG12 and appear on lead 100. Thus it can be seen that the directory number assignments have resulted in a simplification of the decoding circuitry. The first digit can be only 1 or 2 and therefore only three flip-flips are required for decoding it. The second digit may be 0 through 5 and four flip-flips are required to decode it. Also, since there are only six different digits used in the twelve directory numbers, only four different dialing tones need be sent in groups of two.

AND gates AG30, AG31 and AG33 and OR gates OG4, OG5, and OG11 comprise part of the error checking circuitry of the primary register. This is accomplished by detecting the simultaneous decoding of more than one digit at a time by the decoding circuitry. In this event the OR gate OG11 will produce an output which is fed to the register control circuit of FIG. 3 over lead 30. This pulse on lead 30 will set flip-flop 13, send out a trouble alarm on lead 92 and reset flip-flop FF14, so that its output is shifted from lead 95 to lead 96, thereby removing the signal from TOP1 and applying it to TOP2, thus switching in duplicate register 2. If both AG1 and AG2 have outputs, AG30 and OG11 will also have outputs and register 2 will be substituted for register 1. AG31 has as inputs, the outputs of FF5, FF8 and OG4, the inputs of which are the outputs of FF6 and FF7. Thus, if FF5, FF8 and either FF6 or FF7 are set, AG31 and OG11 will have outputs, indicating an error in the second digit, since no more than two of the flip-flips FF5 through FF8 should be set at the same time. Similarly, if FF6 and FF7 and either FF5 or FF8 are set simultaneously, AG33 and OG11 will have outputs, and register switch-over will occur.

Returning to the circuitry of FIG. 2B, the lead 100 from OG12 is applied to inhibit gate IG3 and AND gate AG28. The inhibit input of IG3 is the lead BYI which carries the busy pulses from all of the line circuits on a time division multiplex basis. BYI also forms the second input of AG28, the output of which is connected to the set input of busy flip-flip FF10. The output of IG3 is connected to the input of "signal end detector" SE2, one input of OR gate OG13, one input of AND gate AG34 and to all of the line circuits over lead CII. The set output of FF10 is connected to lead EHT to initiate the generation of a busy signal in common circuits 23. EHT is also connected to one input of inhibit gate IG5, one input of OR gate OG6 and one input of AND gate AG35. The output of SE2 is connected to the set input of flip-flip 9, the set output of which is connected to one input of inhibit gate IG4, to one input of OG10, one input of OG6, one input of AG35, and to the common circuits 23 over lead EOT to initiate the generation of ringing signal. The output of IG4 is connected to the control input of audio gate 98 via lead 33 and to the control input of audio gate 31 via OG14 and lead 32. The output of IG5 is connected to the control input of audio gate 31 via OG14 and lead 32. As stated above, a pulse will appear on lead 100 during the time slot of the called party. If the called party is busy, AG28 will have an output during the callee's time slot and will set busy flip-flip FF10. The setting of FF10 will produce a pulse on lead EHT which is applied to pulse generator PG1 through OR gate OG40. In response thereto PG1 produces a square wave output with alternate on and off periods of one-half second each, over lead HT0. HT0 is fed back to the register to the inhibit input of IG5 and thence to the control input of audio gate 31 to pulse the 500 cycle output of the tone generator from lead TG0 at the busy signal rate of one-half second on and one-half second off. This busy signal is sent back to the calling party through AT1, lead RAS, the line-to-register matrix and the caller's line circuit. If the called party is idle, a pulse will appear on lead CII during the time slot of the callee and will be applied to all line circuits to effect the line-to-line connection in the matrix 19, as explained above. Also, at the end of this CII pulse, SE2 will produce an output and set FF9, producing a pulse on lead EOT. The EOT pulse is fed to the common circuits 23, passes through OR gate OG41 and switches on pulse generators PG2 and PG3. The output of PG2 is connected to the input of IG10 and the output of PG3 to the inhibit input of IG10. PG2 produces square pulses of 1 second duration with an off period of about 2 seconds between pulses and PG3 produces square wave pulses of 20 cycle frequency. Therefore the output OT0 of IG10 is a series of intermittent 20 cycle pulses which control the ringing signal. The signal on OT0 is fed through IG4 as long as FF9 is set to the control input 33 of audio gate 98 and the control input 32 of audio gate 31 via OG14. In response to the control signal, audio gate 98 applies the 500 cycle tone generator output on lead TG0 to the called party at the ringing signal rate via lead RAR, the line-to-register matrix, the caller's line circuit, the line-to-line matrix and the callee's line circuit. Simultaneously, the audio gate 31 sends the same signal to the caller as ringback tone via audio gate 31, attenuator AT1, lead RAS, the line-to-register matrix and the caller's line circuit. When the callee answers or goes off-hook he sends 500 cycle seize tone over his R pair through his line circuit, through the line-to-line matrix to the LAS lead of the caller's line circuit which is connected to the lead RAS through the line-to-register matrix. This seize tone is detected in S detector 34, the output of which is applied to IN2 via SE1 and OG9. The output of IN2 produces a ground or no pulse on lead RBM which is fed back to all of the reset inputs of the flip-flips in the line-to-register matrix of FIG. 3. This resets the flip-flip associated with the caller's line-to-register crosspoint, and makes the register available to process another call. Since the ringback signal is intermittently present on lead RAS, it is necessary to inhibit S detector 34 while audio gate 31 is open. This is accomplished by IG7, the input of which is connected to lead 32, the control input of 31. As soon as the callee's tone is detected by 34 IG7 is inhibited by the connection from the output of 34.

The AND gates AG34 and AG35 and OR gate OG6 comprise the remainder of the register error-checking circuitry. If a pulse is present on lead CII indicating an idle callee and the busy flip-flip FF10 is also set indicating a busy callee, AG34 will have an output and actuate the register switch-over circuitry of FIG. 3, as described above. Also, if FF9 and FF10 are simultaneously set, AG35 will also have an output and register switch-over will occur.

OR gate OG10 and interval timer IT1 comprise the register time-out circuitry which drops the call if the connection is not made within a predetermined interval. One of the inputs of OG10 is the output of IG6 which applies dial tone to the caller. Thus IT1 is energized at the beginning of the dial tone and will produce an output a predetermined time later which will be applied to IN2 via OG9 to break down the line-to-register crosspoint as previously described. The pulse on lead 38 produced by the setting of FF4 replaces the output of IG6 at the input of OG10 after the transmission of the first dialing digit. Thus if a period longer than the interval of IT1 elapses between the transmission of the first and second dialing digits, the connection will be dropped. The other two inputs of OG10 are the outputs of FF9 and FF10, therefore, if the busy signal or the ringing signal persist longer than the interval of IT1, the connection will be dropped.

Part of the common circuits 23 of FIG. 2B have already been described in connection with the register circuitry. The remainder of the common circuits comprises the 500 cycle tone generator comprising SO1, SO2 and associated circuitry. OR gate OG42 receives the "enable tone generator" pulses on one of the two leads ETG depending on which register is operating. The output of OG42 forms one of the inputs of AND gates AG36 and AG37. The other input of AG36 is the set output of flip-flip FF40 and the other input of AG37 is the reset output of FF40. The outputs of AG36 and AG37 are applied to the control inputs of 500 cycle oscillators SO1 and SO2 and also form the inputs of OR gate OG43. The outputs of SO1 and SO2 are applied in parallel to lead TG0. 500 cycle detector 39 has its input connected to TG0 and its output to the inhibit input of IG9, the other input of which is the output of OG43. The output of IG9 is connected to the input of interval timer IT2, the output of which is connected to the set input of flip-flip FF41. The set output of FF41 is connected to the reset input of FF40 and to a trouble alarm circuit, not shown. FF40 is normally set and therefore any inputs on the ETG leads will pass through OG42 and AG36 and will enable or switch on SO1. The output of SO1 on TG0 will be detected by 39 and inhibit IG9. Upon failure of output from SO1, IG9 will no longer be inhibited and the output of AG36 will pass through OG43 and IG9 to IT2. A short time later IT2 will produce an output which will set FF41, the output of which will reset FF40. This will enable AG37 and feed the ETG pulse to the control input of duplicate 500 cycle oscillator SO2, which will now start operation and supply the output.

Figures 5A, 5B:
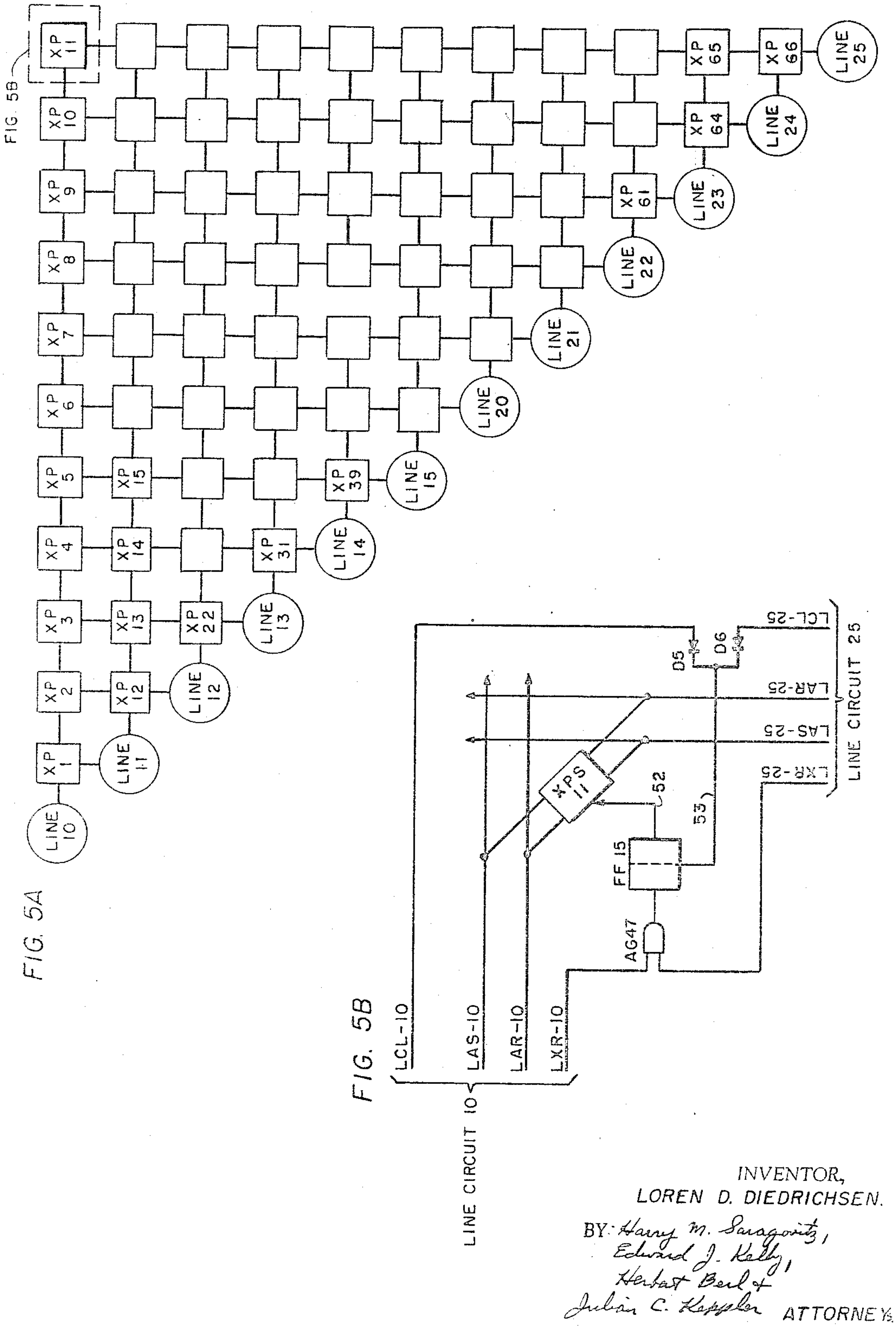

FIG. 5A shows the connection of the twelve line circuits to the line-to-line matrix and FIG. 5B shows a detailed diagram of one of the cross-points thereof. The matrix is a triangular one and provides sixty-six crosspoints so arranged that any six different pairs of telephones can be simultaneously connected to each other. That is, all of the twelve telephones connected to the switchboard may be used simultaneously. Such a matrix is known as a non-blocking matrix and the triangular configuration contains the minimum number of crosspoints which will allow all telephones to be used simultaneously. The leads LXR*n*, LCL*n*, LAS*n* and LAR*n* from each line circuit extend along the horizontal and vertical lines of the matrix and are connected to each of the crosspoints therealong. For example, the leads LXR11, LCL11, LAS11 and LAR11 from line circuit 11 extend upward to crosspoint 1 (XP1) and to the right to XP12, 13, 14, etc. The crosspoint XP11 which is used to connect lines 10 and 25 is illustrated in detail in FIG. 5B. Horizontal leads LCL10, LAS10, LAR10 and LXR10 extend from line circuit 10 and vertical leads LCL25, LAR25, LAS25 and LXR25 from line circuit 25. LXR25 and LXR10 form the inputs of AND gate AG47, the output of which is connected to the set input of flip-flip FF15. The set output of FF15 is connected to the control input of crosspoint switch XPS11 via lead 52. XPS11 is a double pole, single throw switch similar to the crosspoint switches of the line-to-register matrix. When XPS11 is closed by a pulse on lead 52, LAS10 is connected to LAR25 and LAR10 to LAS25. Thus the S pair of each party is connected to the R pair of the other party. LCL10 is connected to the reset input of FF15 through diode D5 and lead 53 and LCL25 thereto through D6. As explained in connection with the description of the line circuits, both the calling and called line circuits will produce pulses on their LXR leads during the time slot of the called party. At the crosspoint at which the lines intersect, the AND gate, for example AG47 of crosspoint 11, will have pulses on both its inputs and will set flip-flip FF15. This will produce a pulse on lead 52 which closes crosspoint switch XPS11. The flip-flip FF15 is of the same type used in the line-to-register matrix, that is, the reset line 53 thereof produces a negative voltage when set and the reset line is grounded to reset the flip-flip. The voltage on lead 53 is fed back to the connected line circuits via leads LCL25 and LCL10 to mark these lines busy and perform other functions.

At the completion of a call, when either party hangs up, his telephone will send a 1700 cycle release tone over the R pair to the connected line circuit (see FIG. 4). Since there is a pulse from the line-to-line matrix on the LCL lead of each line circuit, the seize tone filter section of TF1 will be inhibited but the release tone filter will not, since 1N4 has no output. Therefore, upon receipt of the release tone, AG42 will have an output which is fed to "signal end detector" SE3. At the end of the release tone, SE3 puts out a ground which is fed over lead 41, through OG15, lead LCL to the reset lead 53 of the flip-flip of the crosspoint associated with the two connected lines. It is necessary to detect the end of the release tone to insure that the connections will not be broken before this tone is passed on to other connected switchboards. The grounding of lead 53 resets FF15, thus opening XPS11 and breaking down the connection.

Figure 6A:
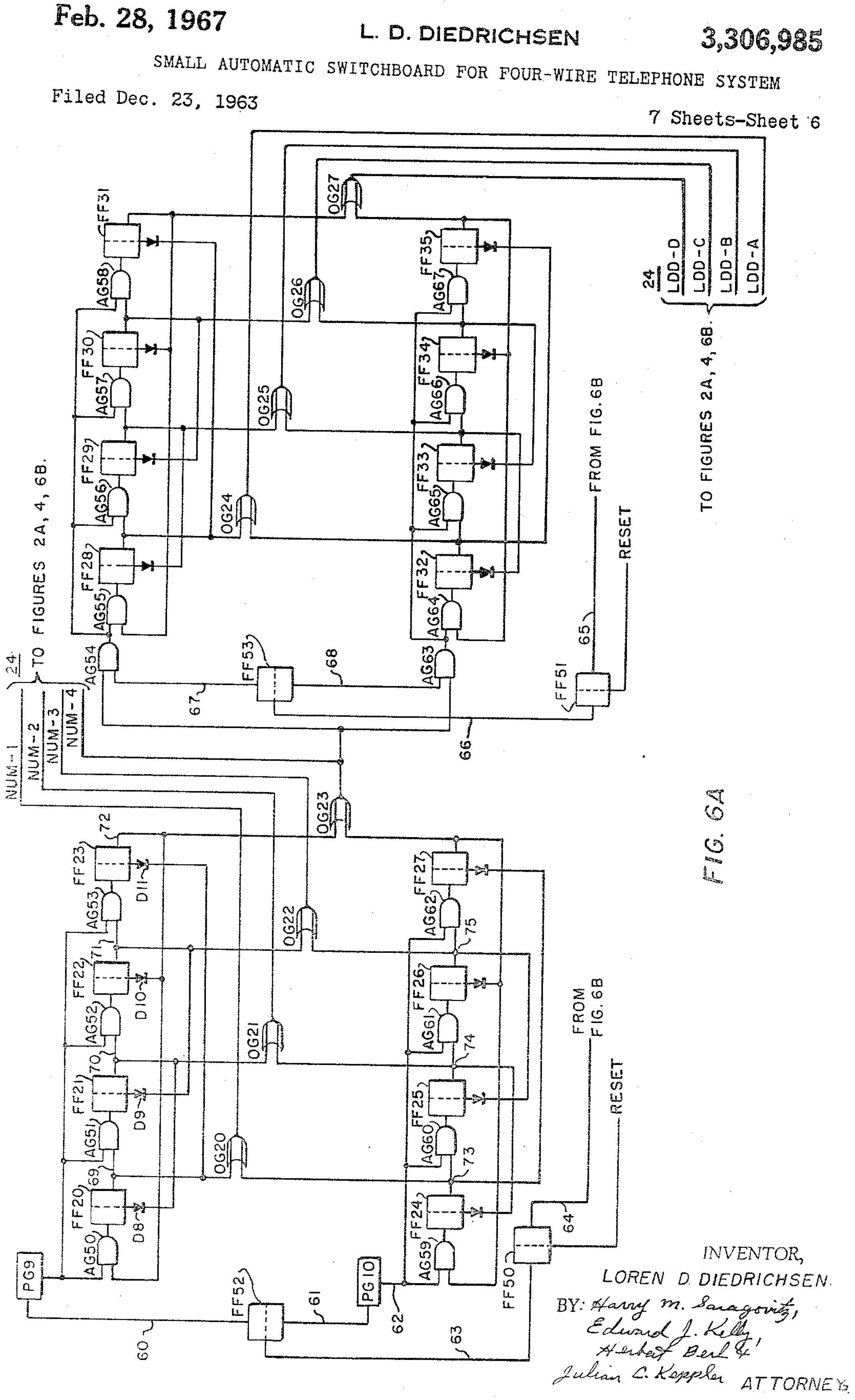
Figure 6B:
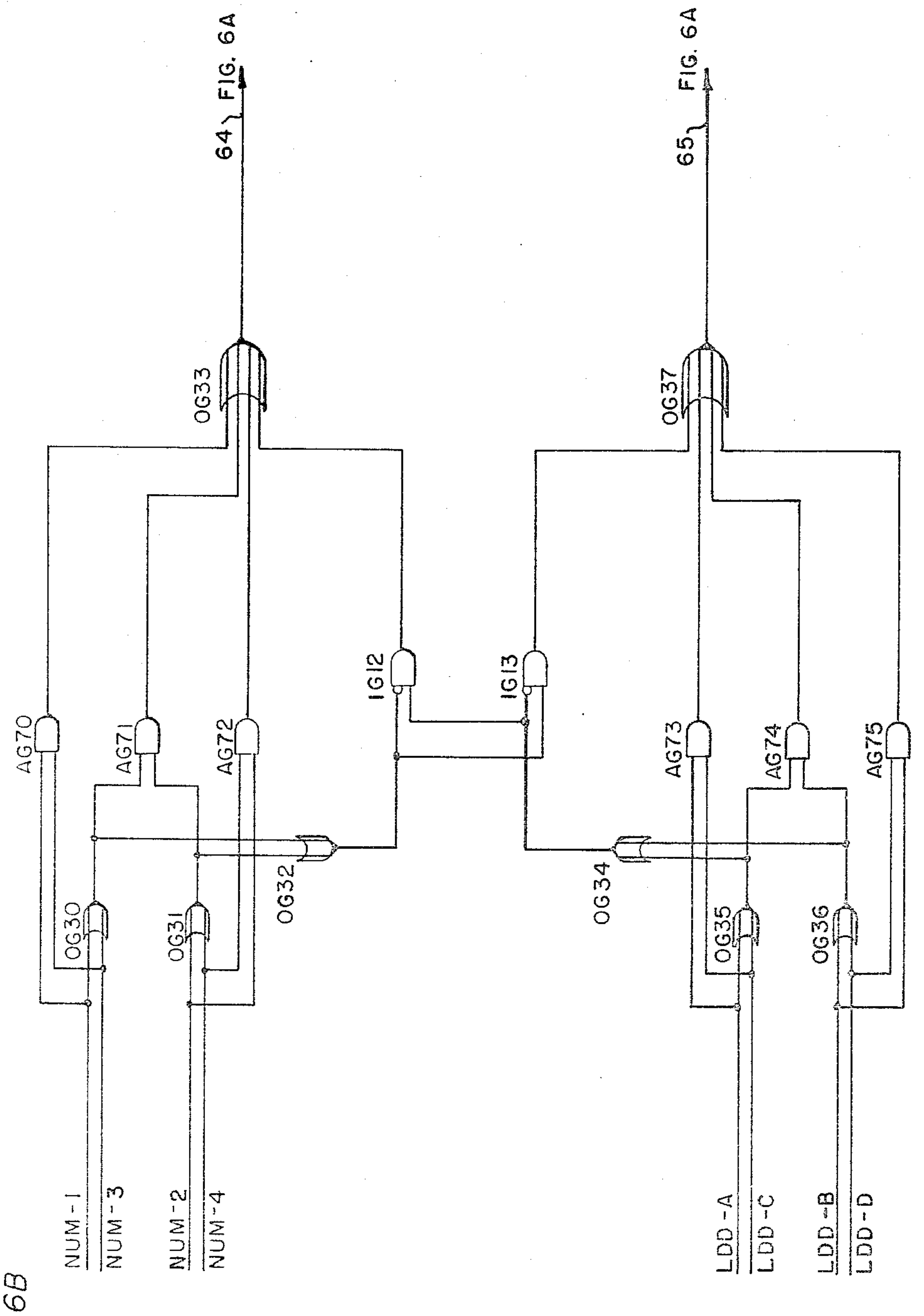

The time slot generator 15 and its error-checking circuitry are illustrated in FIGS. 6A and 6B respectively. The primary numbers generator comprises a four stage ring counter comprising flip flips FF20 through FF23 and associated AND gates AG50 through AG53. The set input of FF20 is connected to the output of AG50. The inputs of AG50 are the output of pulse generator PG9 and the set output of FF23. Similarly the input of each stage of the ring counter comprises the output of its associated AND gate. The inputs of all of the AND gates are, the output of PG9 and the output of the preceding stage of the counter. Also, the reset inputs of each flip-flip are connected to the outputs of the succeeding counter stage via one of the diodes D8 through D11. One of the four flip-flips is conducting at a time and each pulse from PG9 shifts the conduction to the succeeding stage or flip-flip. If, for example, FF20 is conducting or set, the next pulse from PG9 will pass through AG51 to set or turn on FF21, the output of which on lead 70 will be fed back to FF20 via diode D8 to reset FF20. Also, the output of FF21 will enable gate AG52 so that the next pulse from PG9 will be applied to FF22, etc. The output of FF23 on lead 72 enables gate AG50 and the output of FF20 on lead 69 resets FF23 via diode D11, thus the four counter stages are connected in a ring and the conduction will shift around the ring each time a pulse is received from PG9. The outputs of each of FF20 through FF23 on leads 69 through 72 form one of the inputs of OR gates OG20 through OG23 respectively. The outputs of these OR gates are the leads NUM1 through NUM4. The frequency of pulse generator PG9 is 100 c.p.s., therefore each one of the leads NUM1 through NUM4 will be sequentially energized for 10 millisecond periods. PG9 has its control input connected to the set output of flip-flop FF52 via lead 60. The reset output of FF52 is connected to the control input of PG10 via lead 61. The flip-flips FF24 through FF27 and the associated circuitry comprise a duplicate numbers signal generator similar to the one already described which has its output also connected to leads NUM1 through NUM4 via OG20 through 23. This duplicate circuitry is automatically switched on in the event that the error-checking circuitry of FIG. 6B detects an error in the numbers signals on leads NUM1 through NUM4. In this event a pulse is fed over lead 64 from FIG. 6B, setting flip-flip 50 the output of which resets FF52 via lead 63. The resetting of FF52 stops the operation of PG9 and starts PG10. Thus the numbers signals will thereafter be supplied by the duplicate ring counter comprising FF24 through FF27. The primary letters generator comprises flip-flips FF28 though FF31 and AND gates AG55 through AG58. These are connected as a four stage counter similar to the numbers generators. The letters generator however is driven or pulsed by one of the outputs, NUM4, of the numbers generator and therefore each stage of the letters generator will be conducting for four times as long as the stages of the numbers generator. The lead NUM4 is applied to one input of gates AG54 and AG63, the other input of AG54 is the set output of flip-flops 53 and the other input of AG63 is the reset output of FF53. FF53 is normally set so that the primary letters generator comprising FF28 through FF31 normally supplies the letters signal outputs on leads LDDA through LDDD via gates OG24 through OG27. The duplicate letters generator comprises the flip-flips FF32 through FF35. This generator is automatically switched on in the event that the error checking circuitry of FIG. 6B detects an error in the letters signals. The circuitry is similar to the switch-over circuitry of the numbers generator. The flip-flip FF51 will be set by an error signal on lead 65 and will reset FF53 to switch the pulses from NUM4 from the output of AG54 to the output of AG63. It can be seen that different combinations of the letters and numbers generator outputs will determine different 10 millisecond time slots which are assigned to the line circuits in accordance with schedule given above.

The error-checking circuitry of the time slot generator is shown in FIG. 6B. Leads NUM1 and NUM3 form both inputs of OR gate 30 and AND gate AG70. The output of AG70 comprises one of the inputs of OR gate OG33. The leads NUM2 and NUM4 comprise both inputs of OR gate OG31 and AND gate AG72. The output of AG72 forms another input of OG33. The outputs of OG30 and OG31 form the inputs of AG71 and OG32. The output of AG71 is fed to another input of OG33 and the output of OG32 is fed to the inhibit input of inhibit gate IG12 and also to one input of IG13. The output of IG12 forms the fourth input of OG33. The numbers error signal appears at the output of OG33 on lead 64 and initiates the switch-over to the duplicate numbers generator of FIG. 6A, as explained above. The letters generator error-checking circuitry comprises the gates OG34, OG35, OG36, AG73, AG74, AG75, OG37, and IG13 which are connected to leads LDDA through LDDD in the same manner as the numbers generator error-checking circuit just described. This error-checking circuitry produces an error signal output if more than one of the numbers or letters signal leads are energized simultaneously or if either of the numbers of letters generators has no output. For example, if both NUM1 and NUM3 have outputs simultaneously, AG70 will have an output which will pass through OG33 to lead 64. If NUM2 and NUM4 both have outputs AG72 will pass the numbers error signal to lead 64. If either NUM1 and NUM2 or NUM3 and NUM4 are simultaneously energized, AG71 will pass the numbers error signal to lead 64. The letters error checking circuitry detects the presence of more than one letters signal in the same way as does the numbers circuitry. If there is an output on at least one of the leads NUM1 through NUM4, OG32 will have an output and will inhibit IG12, however if there is no output on any of these numbers generator leads, IG12 will apply the output of OG34 to OG33 and thence to lead 64. Similarly, if none of the letters generator leads have an output, OG34 will have no output and IG13 will pass the output of OG32 to lead 65 via OG37 to produce a letters error signal thereon.

A detailed circuit diagram of the novel bistable flip-flips used throughout the above-described switchboard is shown in FIG. 7. The collector of PNP transistor T1 is connected to the negative terminal of bias battery B2 via resistor R12 and also directly to the base of NPN transistor T2. The emitter of T1 is connected to ground via resistor R10 and to the emitter of T2 via resistor R11. The emitter of T2 is connected to the negative 10 volt bias source B2 via diode D12. The collector of T2 is connected to set output terminal 82 and thence to the base of T1 via resistor R14 and diode D13. The reset input terminal 81 is connected to the junction of R14 and D13 via diode D15. The set input terminal 80 is connected to the base of T1 via resistor R15 and diode D14. The base of T1 is connected to ground via resistor R13. In the off or reset state both transistors T1 and T2 are nonconducting and in the on or set condition both transistors are conducting. This is what distinguishes a flip-flip from a flip-flop, in which conduction is shifted between the two halves of the circuit. The advantage of a flip-flip over a flip-flop is that in the off or reset condition it draws no current, and thus conserves the power supply in applications where the duty cycle is low, that is, where the flip-flip is off or reset most of the time. In the reset state T1 is cutoff or nonconducting because the flow of current from the positive terminal of B2, ground, R10, R11 and D12 puts a back or reverse bias on the base-emitter junction thereof. Since there is no current flow through R12, the collector of T1 and also the base of T2 will be substantially at −10 volts. Since the emitter of T2 is slightly more positive than −10 volts, T2 will also be cutoff and the set output terminal 82 will be substantially at ground or zero volts. The circuit is set by the application of a negative pulse to set input terminal 80. This pulse overcomes the back bias of the base-emitter circuit and biases T1 into conduction. As a result the collector thereof will rise from −10 volts toward zero volts due to the collector current in R12. This makes the base of T2 positive relative to its emitter and produces a forward base-emitter bias which switches T2 into conduction. As a result collector current flows from ground through R13, D13, R14 and the collector of T2, producing a negative voltage at terminal 82, and a slightly smaller negative voltage at terminal 81 and at the base of T1. This negative voltage at the base of T1 comprises a feedback or latching voltage which holds both transistors on after the setting pulse disappears. The circuit is reset by grounding reset terminal 81. This shorts out the voltage across R13 and disables the feedback circuit, thus returning both T1 and T2 to the nonconducting state. It should be noted that a negative voltage appears at the reset terminal 81 while the flip-flip is in the set state. Thus this terminal can provide a "set output" signal as well as serving as the reset input. This feature simplifies the circuitry in many applications of this flip-flip. For example, in the circuit of the crosspoint switches illustrated in FIG. 5B, the reset terminal 53 of flip-flip FF15 provides a "line connected-to-line" pulse which is applied to the line circuit over leads LCL25 and LCL10. When it is desired to break the connection, either one of the leads LCL25 or LCL10 is grounded at one of the line circuits, thus resetting FF15. Similarly, in the line-to-register matrix of FIG. 3, the reset terminal 91 of FF11 supplies a "line connected to register" pulse to the line circuit 10 over lead LCR10 and the flip-flip can be reset by grounding lead RBM. It should be noted that the base-emitter junction of T2 is connected across or in parallel with the collector resistor R12 of T1, so that T2 will conduct only when T1 conducts and T2 will be cutoff whenever T1 is cutoff. Illustrative values for the components of FIG. 7 are as follows:

| | | |
|---|---|---|
| R10 | ohms | 15,000 |
| R11 | do | 100,000 |
| R12 | do | 12,000 |
| R13 | do | 27,000 |
| R14 | do | 2,700 |
| R15 | do | 68,000 |
| D12, D13, D14, D15 | | 1N270 |
| T1 | | 2N404 |
| T2 | | 2N388 |

These values are illustrative only and are subject to variations at the option of the designer.

While the invention has been described in connection with a preferred embodiment, it should be understood that various changes in the construction and arrangement of the circuitry may be made without departing from the inventive concepts herein disclosed, accordingly the invention should be limited only by the scope of the appended claims.

What is claimed is:

1. A compact automatic switchboard for use in a four-wire electronic telephone system, comprising; a plurality of line circuits, the send and receive pairs of each connected four-wire telephone being connected to a different one of said line circuits, each line circuit containing means to detect seize and release tone sent by said connected telephones, each of said line circuits being connected to a line-to-register matrix, to a line-to-line matrix and to the output of a time slot generator, said line-to-register matrix being connected to a register control circuit and to a primary register and a duplicate register, common circuits connected to both of said registers, the output of said time slot generator also being connected to each of said registers, means responsive to the detection of seize tone in a calling line circuit to connect the send and receive pairs of said calling line to both of said registers by closing a crosspoint corresponding to said calling line circuit in said line-to-register matrix, means in said register control circuit to apply operating power to said primary register in response to the closing of any crosspoint of said line-to-register matrix, means to prevent any other line circuit from seizing said registers while said calling line circuit is connected thereto, a busy lead connected to all of said line circuits and to both of said registers, said time slot generator defining a unique time slot for each of said line circuits, said time slots being used to identify said line circuits on a time division multiplex basis, means to produce a pulse on said busy lead during a calling line circuit's time slot in response to the closure of the calling line's crosspoint in said line-to-register matrix, decoding means within both of said registers for decoding combinations of dialing tones sent from a calling telephone, said decoding means producing a pulse during the time slot of the called line circuit, means to send a busy signal back to said calling telephone if the called telephone is busy, means controlled by the output of said decoding means to apply a pulse to all of said line circuits during the time slot of said called line circuit if said called telephone is idle, means responsive to said last-named pulse to send a "line crosspoint request" pulse to said line-to-line matrix from the calling line circuit and called line circuit, means responsive to said "line crosspoint request" pulses to close the line-to-line crosspoint corresponding to the calling and called lines, thus connecting the said pair of each party to the receive pair of the other party, means to send ringing signal from said common circuits to said called telephone and ringback signal to said calling telephone, means responsive to the detection of seize tone from said called telephone to release said calling line circuit from said register by opening said line-to-register crosspoint, and means to release said line-to-line crosspoint connection upon the receipt of release tone from either said calling or called telephones.

2. The switchboard of claim 1 wherein said line-to-line matrix comprises a non-blocking triangular array of crosspoint switches, whereby all of the connected telephones may be in use simultaneously, and wherein each of said crosspoint switches is closed by the simultaneous application to an AND gate of said "line crosspoint request" pulses from said calling and called line circuits, the output of said AND gate being applied to the set input of a flip-flip circuit, the output of which is applied to the control input of the crosspoint switch corresponding to the calling and called lines, and means to connect the reset input of said flip-flip to said calling and called line circuits.

3. The switchboard of claim 1 wherein twelve telephones are connected thereto, the directory numbers of which are 10 through 15 and 20 through 25 and wherein said decoding circuitry of said registers comprises four tone detectors, A, B, C and D, tuned to a different one of four dialing tones, A, B, C and D, sent from said calling telephone in groups of two tones each, the tones AB representing 0, AC representing 1, AD representing 2, CD representing 3, BD representing 4 and BC representing 5, means for decoding the first digit of a dialed directory number comprising first, second and third flip-flips, the set inputs of which are connected respectively to the outputs of tone detectors, C, A and D, a first AND gate, the inputs of which comprise the set outputs of said first and second flip-flips and a second AND gate, the inputs of which comprise the set outputs of said second and third flip-flips, whereby an output from said first AND gate indicates that the first digit of a dialed directory is 1 and output from said second AND gate indicates that the first digit of a dialed directory number is 2, said decoding circuitry further including fourth, fifth, sixth and seventh flip-flips, the set inputs of which are connected respectively to the outputs of tone detectors, A, B, C, and D, a third AND gate, the inputs of which comprise the set outputs of said fourth and fifth flip-flips, a fourth AND gate, the inputs of which comprise the set outputs of said fourth and sixth flip-flips, a fifth AND gate, the inputs of which comprise the set outputs of said fourth and seventh flip-flips, a sixth AND gate, the inputs of which comprise the set outputs of said sixth and seventh flip-flips, a seventh AND gate, the inputs of which comprise the set outputs of said fifth and seventh flip-flips, and eighth AND gate, the inputs of which comprise the set outputs of said fifth and sixth flip-flips, whereby an output from said third AND gate indicates that the second digit of a dialed directory number is 0, an output from said fourth AND gate indicates a second dialed digit of 1, an output from said fifth AND gate indicates a second dialed digit of 2, an output from said sixth AND gate indicates a second dialed digit of 3, an output from said seventh AND gate indicates a second dialed digit of 4 and an output from said eighth AND gate indicates a second dialed digit of 5.

4. The switchboard of claim 1 in which said primary register is provided with error detection circuitry which monitors the performance of said primary register, the output of said error detection circuit being connected to said register control circuit to automatically remove said operating power from said primary register and apply said power to said duplicate register upon the detection of an error in said primary register.

5. A small, compact automatc switchboard for use in a four-wire electronic telephone system, comprising; a plurality of line circuits, the send and receive pairs of each connected four-wire telephone being connected to a different one of said line circuits, each of said line circuits being connected to a line-to-register matrix, to a line-to-line matrix and to the output of a time slot generator, said time slot generator defining a unique time slot for each connected telephone, said line-to-register matrix being connected to a register control circuit and to a primary and duplicate register, common circuits connected to both of said registers, the output of said time slot generator also being connected to each of said registers, means responsive to the detection of seize tone in a calling line circuit to connect the send and receive pairs of a calling telephone to both of said registers by closing a crosspoint corresponding to said calling line circuit in said line-to-register matrix, means in said register control circuit to apply operating power to said primary register in response to the closing of any crosspoint of said line-to-register matrix, means to prevent any other line circuit from seizing said registers while said calling line circuit is connected thereto, decoding means within both of said registers for decoding combinations of dialing tones sent from said calling telephone, said decoding means producing a pulse during the time slot of the called line circuit, means controlled by the output of said decoding means to apply a pulse to all of said line circuits during the time slot of the called line if said called line is idle, means responsive to said last-named pulse to send a "line crosspoint request" pulse to said line-to-line matrix from the calling line circuit and from the called line circuit, means responsive to said "line crosspoint request" pulses to close the line-to-line crosspoint corresponding to the calling and called lines, thus connecting the send pair of each party to the receive pair of the other party, said line-to-line matrix comprising a triangular, non-blocking array of crosspoint switches, whereby all of said connected telephones may be in use simultaneously, means responsive to the detection of seize tone from said called telephone to release said calling line circuit from said registers by opening said line-to-register crosspoint, means to release said line-to-line crosspoint connections upon the receipt of release tone from either said calling or called telephone.

6. The switchboard of claim 5 wherein the number of connected telephone is twelve, the directory numbers of which are 10 through 15 and 20 through 25 and wherein the number of different dialing tones is four, said dialing tones being sent from said calling telephone in groups of two.

7. The switchboard of claim 5 wherein said primary register includes error detection circuitry for monitoring the accuracy thereof and means in said register control circuit for automatically removing said operating power from said primary register and applying said power to said duplicate register in response to an output from said error detection circuitry and wherein said time slot generator comprises a primary numbers generator, a primary letters generator, a duplicate numbers generator and a duplicate letters generator, said primary numbers and letters generators normally supplying the output of said time slot generator, error detection circuitry connected to said output of said time slot generator, the output of said error detection circuitry being arranged to switch said duplicate numbers and letters generators to the output of said time slot generator upon detection of an error.

8. A small, compact automatic switchboard for use in a four-wire electronic telephone system, comprising; a line circuit for each connected telephone, means to connect a calling telephone to a primary and duplicate register and to apply operating power to said primary register in response to the receipt of seize tone from said calling telephone, decoding means in said primary register for decoding groups of dialing tones sent from said calling telephone, the output of a time slot generator connected to said line circuits and said register, said time slot generator producing a unique time slot for each connected telephone, said decoding means applying a pulse during the time slot of a called telephone to all of said line circuits, means responsive to the receipt of said pulse at the calling and called line circuits to connect the calling and called telephones via a non-blocking line-to-line matrix, means responsive to the receipt of seize tone from said called telephone to disconnect said calling telephone from said registers, and means responsive to the receipt of release tone from either said calling or called telephones to break the connection of said calling and called telephones in said line-to-line matrix.

9. The switchboard of claim 8 further including error detection means connected to said primary register to monitor the performance thereof and to remove said operating power from said primary register and apply said operating power to said duplicate register in response to an output from said error detection means, and wherein said time slot generator comprises a pair of numbers signal generators, one of which normally is applied to the output of said time slot generator and a pair of letters signal generators, one of which normally is applied to the output of said time slot generator, error detection circuitry connected to the output of said time slot generator, the output of said error detection circuitry being arranged to switch the other ones of said pair of numbers and letters signal generator to the output of said time slot generator upon detection of an error.

10. The switchboard of claim 8 wherein the number of connected telephones is twelve, the directory numbers of which are 10 through 15 and 20 through 25 and wherein the number of different dialing tones is four, said dialing tone being sent from said calling telephones in groups of two.

11. The switchboard of claim 8 wherein said decoding means comprises a plurality of dialing tone detectors, the outputs of which are arranged to set a first group of transistorized flip-flips to decode the first dialed digit of a directory number and to set a second group of flip-flips to decode the second digit of a dialed directory number and wherein said time slot generator comprises a plurality of signal generators each comprising a ring counter, the stages of which comprise transistorized flip-flips.

12. The switchboard of claim 11 wherein said flip-flips comprise first and second transistors, means to apply a fixed reverse bias to the base-emitter junction of said first transistor, the base-emitter junction of said second transistor being connected in parallel with the collector resistor of said first transistor, whereby both of said transistors are non-conducting to define a first stable state of operation, means to apply a set pulse to the base-emitter junction of said first transistor of such polarity to overcome said fixed reverse bias thereof and render both of said transistors conducting to define a second stable state of operation, and feedback means between the collector of said second transistor and the base-emitter junction of said first transistor whereby both transistors remain conducting after the removal of said set pulse.

13. A logic circuit having two stable states of operation, comprising first and second transistors, means to reverse bias the base-emitter junction of said first transistor, a first resistor connected between the collector of said first transistor and one terminal of a source of bias potential, the base of said second transistor connected to the collector of said first transistor, the emitter of said second transistor connected to said terminal of a source of bias potential via a first diode; a second resistor, a second diode, and a third resistor serially connected from the collector of said second transistor to the other terminal of said source of bias potential, the junction of said second diode and said third resistor connected to the base of said first transistor, a set input terminal connected to the base of said first transistor, a set output terminal connected to the collector of said second transistor and a reset input terminal connected to the junction of said second resistor and said second diode.

14. A logic circuit having two stable states of operation comprising, first and second transistors, means to apply a fixed reverse bias to the base-emitter junction of said first transistor, the base-emitter junction of said second transistor being connected in parallel with the collector resistor of said first transistor, whereby both of said transistors are normally non-conducting, means to apply a set pulse to the base-emitter junction of said first transistor of such polarity to overcome said fixed reverse bias thereof and render both of said transistors conducting, and feedback means between the collector of said second transistor and the base-emitter junction of said first transistor whereby both transistors remain conducting after the removal of said set pulse.

References Cited by the Examiner

UNITED STATES PATENTS

| | | | |
|---|---|---|---|
| 2,931,863 | 4/1960 | Faulkner | 179—15 |
| 2,958,789 | 11/1960 | Lee | 307—88.5 |
| 2,988,601 | 6/1961 | Brightman | 179—15 |

KATHLEEN H. CLAFFY, *Primary Examiner.*

L. A. WRIGHT, *Assistant Examiner.*